Patented Mar. 30, 1937

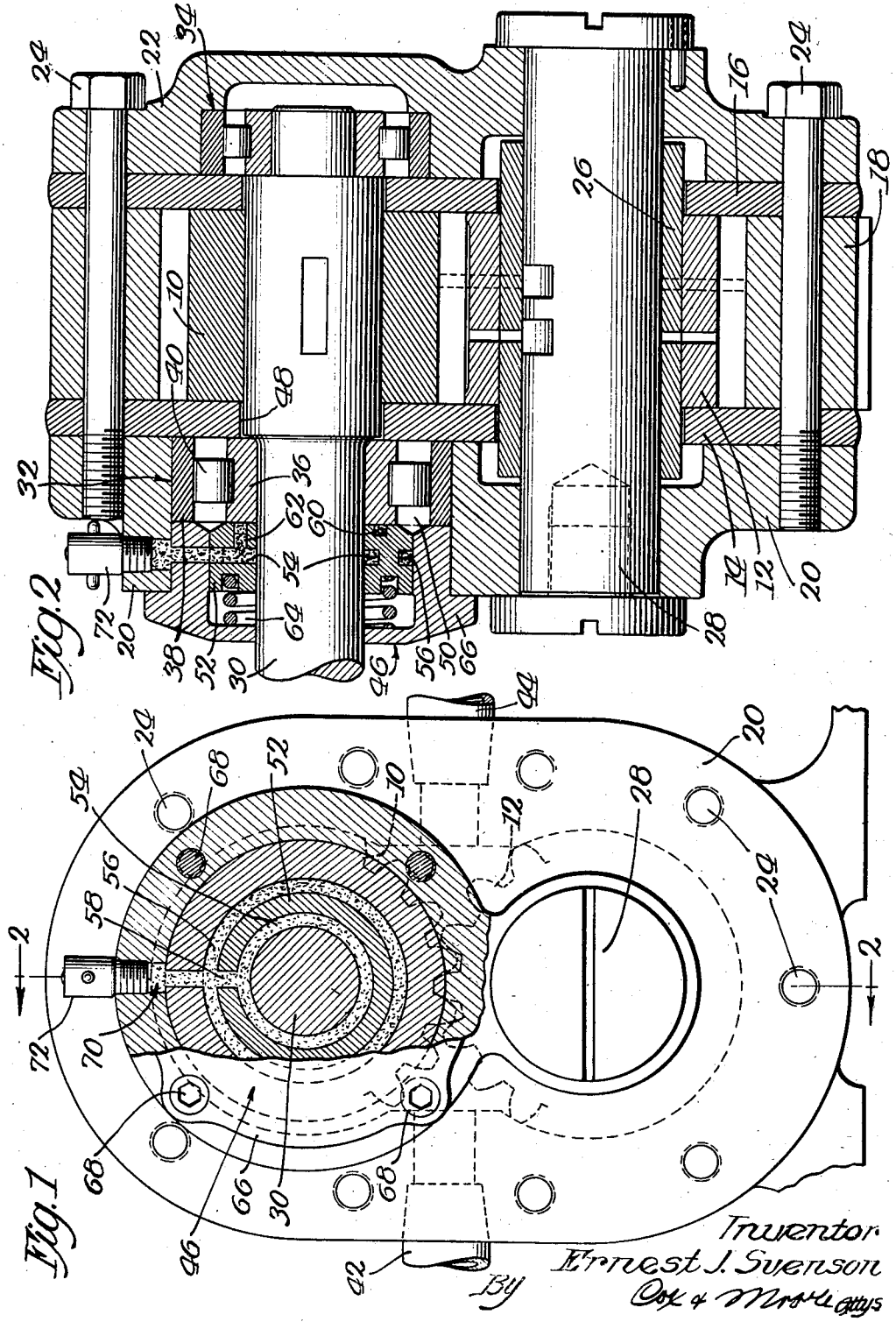

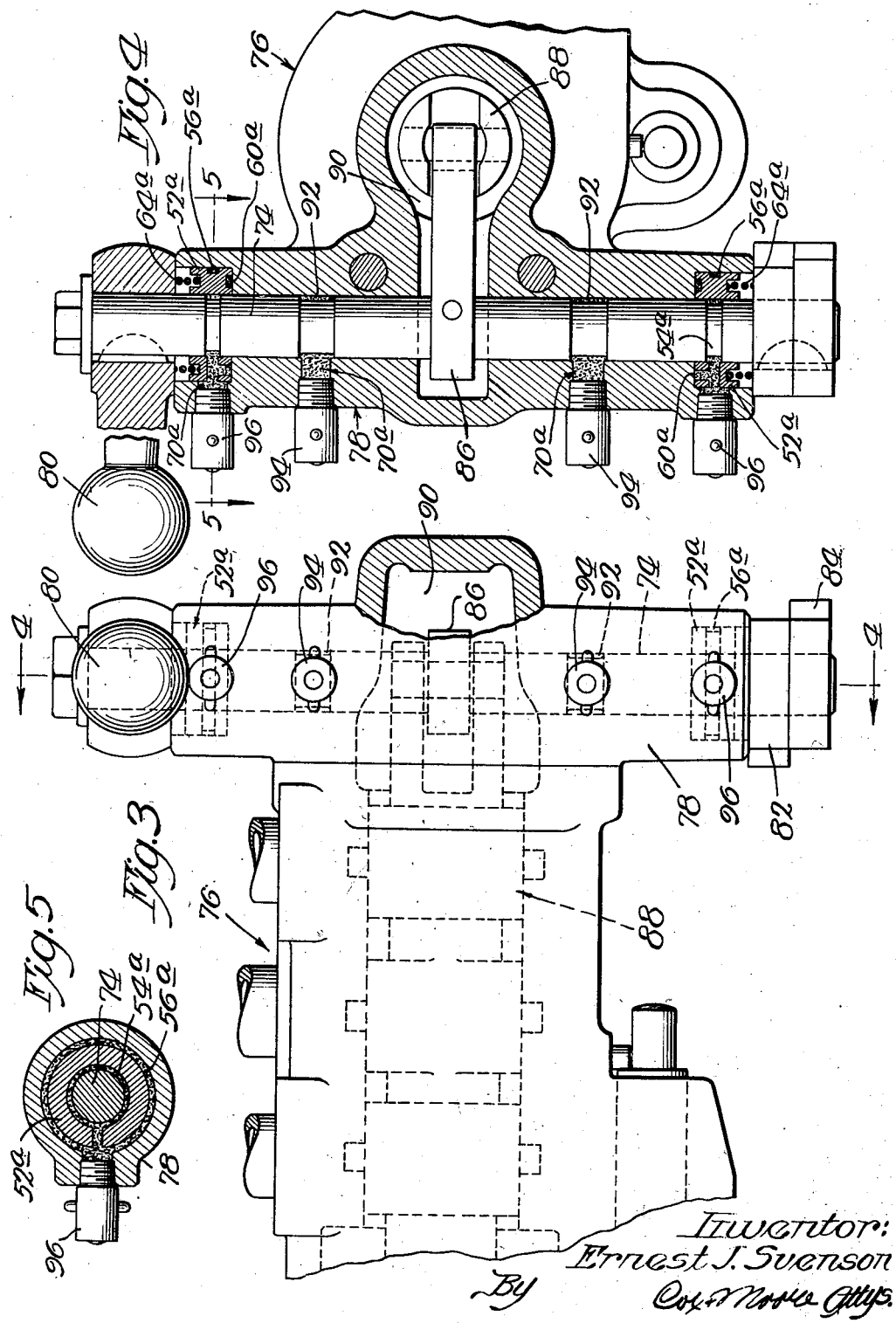

2,075,148

UNITED STATES PATENT OFFICE 2,075,148

SEALING DEVICE

Ernest J. Svenson, Rockford, Ill.

Application July 30, 1932, Serial No. 627,026

5 Claims. (Cl. 286—7)

My invention relates generally to fluid sealing devices, and more particularly to devices for sealing fluid under pressure.

In my co-pending application, Serial No. 599,458, filed March 17, 1932, now Patent No. 2,032,817, issued March 3, 1936, I have disclosed a sealing device which is similar in certain respects to the device which forms the subject matter of my present invention, but my present device has certain improved features which render it particularly adaptable for use in connection with hydraulic structures, wherein fluid under pressure must be secured against leakage.

Thus, for example, in fluid pumps wherein rotary parts are employed, the problem of preventing the leakage of high pressure fluid along the peripheral surfaces of said rotary parts is presented. Heretofore it has been common practice, in attempting to prevent the leakage of fluid under pressure, to employ various types of packings, such as raw hide packings. Packings of that type, in order to prevent leakage, must be pressed with considerable force against the rotary part, and it has been found in practice that the accumulation of foreign matter between the packing and the rotary member, in time, causes the rotary part to become worn, and hence necessitates not only the replacement of the part, but also relatively frequent replacement of the packing. Other complicated devices, with which I am familiar, have been employed which, due to continuous frictional contact with the rotating part, cause considerable wear and hence relatively frequent replacement. It is, therefore, one of the primary objects of my present invention to provide an improved practical device of extremely simple construction, which will serve as an effective means for preventing the leakage of fluid under pressure.

More specifically, my invention contemplates the provision of means including a retainer for a plastic or impressionable sealing medium, which retainer cooperates with associated parts to gradually facilitate the sealing of fluid under pressure.

Still more specifically, my invention contemplates the provision of a sealing device, as above set forth, in which a seal retainer is adapted to surround a rotating part and is urged longitudinally thereon into cooperative relationship with the bearing for said rotary part.

Another object of my present invention is to provide an improved, practical sealing device, as above set forth, which may be economically manufactured and which may be applied to the peripheral surface of a rotary part without necessitating any redesign or modification thereof.

Still another object of my invention is to provide a sealing device, which not only incorporates a plastic material, such as a grease compound to provide a seal for fluid under pressure, but also a bearing member cooperatively arranged with the seal and with other structures to counteract fluid leakage. In accordance with this feature of my invention, I propose to provide a seal retainer upon a rotary shaft; for example, the rotary shaft of a pump or fluid valve, which retainer is resiliently urged against a bearing which also surrounds the shaft, said bearing member, in response to the pressure applied thereagainst by the retainer, cooperating with an abutment plate to provide sufficient metal to metal contact to counteract the initial tendency of fluid under pressure to flow beyond said bearing.

A further object of my invention is to provide, in combination with a rotary member such as a shaft, a sealing device which is so arranged that the sealing effectiveness thereof is not impaired when said shaft experiences lateral deflection resulting from the load applied thereto.

The foregoing and numerous other objects and advantages will be more apparent from the following detailed description when considered in connection with the accompanying drawings, wherein—

Figure 1 is an elevational view shown partly in section of a gear pump equipped with a sealing device, which is representative of one embodiment of my invention;

Figure 2 is a central transverse sectional view of the pump taken substantially along the line 2—2 of Figure 1;

Figure 3 is a fragmentary elevational view of a control valve mechanism and operating means therefor, which is equipped with a sealing device of my improved design;

Figure 4 is a transverse sectional view of the valve mechanism taken substantially along the line 4—4 of Figure 3; and Figure 5 is a horizontal sectional view taken substantially along the line 5—5 of Figure 4.

Referring now to the drawings more in detail wherein like numerals have been employed to designate similar parts throughout the various figures, it will be seen that in Figures 1 and 2 a gear pump is shown which includes a pair of meshing gears 10 and 12, which are adapted to rotate between a pair of side plates 14 and 16 secured in proper spaced relation by a central casing section 18. End casing sections 20 and 22 are secured as a unit with the side plates and the central casing section 18 by means of suitable bolts 24.

The gear 12 is mounted upon a sleeve 26 which rotates upon a shaft or valve member 28, while the gear 10 is keyed to and driven by a shaft 30. The sections of the shaft 30 on opposite sides of the plates 14 and 16 are mounted within suitable anti-friction bearings 32 and 34. It will be seen that the bearing 32 is made up of a pair of race members 36 and 38, which serve to retain a plurality of conventional rollers 40.

The gear pump is adapted to receive fluid from a conduit 42 and to deliver fluid under higher pressure through a conduit 44. In accordance with the present invention, I provide a sealing device designated generally by the numeral 46, Figure 2, which serves to prevent fluid under pressure within the gear pump chamber or casing from leaking along the periphery of the drive shaft 30. In other words, I propose to provide the sealing device 46 to prevent fluid under pressure in the space 48, as well as fluid within the area 50, Figure 2, from leaking along the peripheral surface of the shaft 30. If the pressure in the pump becomes excessive, it is possible to connect the space or area 50 with the intake of the pump in such a manner as to decrease the pressure and thereby facilitate the sealing action.

This device 46 includes a seal retainer 52 having an inner annular groove 54 which communicates with an outer annular groove 56 through a radial passage 58 and an annular groove 60 which communicates with the radial passage 58 through a longitudinal passage 62, Figure 2. A coiled spring 64 interposed between the outer surface of the retainer 52 and the inner surface of a cap 66 serves to continuously urge the inner surface of the retainer against the adjacent surface of the race member 36. The cap 66 is secured to the casing member 20 by any suitable means, such as screws 68, Figure 1.

A sealing medium 70, such as a compound of grease, graphite, and binder may be inserted under pressure through a nipple or valve 72 of conventional design. By introducing the sealing material 70 through the nipple 72, the grooves 54, 56, and 60 are filled with said material, the material in groove 54 providing a seal which contacts with the peripheral surface of the shaft 30, the material in the groove 56 contacting with the inner cylindrical surface of the cap 66, and the sealing material within the groove 60 contacting with the companion annular surface of the race member 36, Figure 2. The retainer 52 remains stationary during the rotation of the shaft 30 and the sealing material 70 is preferably maintained under a predetermined pressure so as to insure effective sealing contact with the shaft 30, the race member 36, and the cap 66.

The frictional engagement of the race member 36 with the adjacent surface of the side plate 14, Figure 2, cooperates to counteract leakage of fluid from the space 48 into the space 50. While some of the fluid from the space 48 may leak into the space 50, the pressure of the fluid within the space 50 may be appreciably less than the pressure within the space 48. Thus the race member 36 provides means for initially counteracting fluid leakage over the space 48. Any fluid which may enter the space 50 or pass along the peripheral surface of the shaft 30 from the space 48 is prevented from leaking externally of the pump by means of the annular sections of the sealing material 70 previously described.

One of the distinct advantages of a fluid sealing device of the type set forth above resides in the fact that it not only provides a seal against fluid leakage, but also serves to lubricate the contacting surfaces. By employing the proper seal compound, the sealing of the fluid is obtained without subjecting any of the rotating parts, for example, the peripheral surface of the shaft 30 to any wear. This should be clearly distinguished from other types of seals, such as raw hide seals and the like, wherein considerable wear is experienced when such raw hides are maintained under pressure against a rotating surface. Not only does the raw hide cause a wearing action, but also a development of heat which in a comparatively short time renders the raw hide functionally inoperative, and hence necessitates frequent replacement thereof. It should be apparent therefore from the foregoing description that my invention contemplates an improved sealing device for counteracting leakage of fluid under pressure, which device not only prevents wear of the rotating parts, but also provides the required lubricant therefor.

In Figures 3, 4, and 5 I have shown a fragmentary valve structure. It will suffice for the purpose of describing the present invention to state that my improved sealing device is adapted to be used in rotating or oscillating parts of a valve, such as the oscillatory stem or shaft 74 of a valve designated generally by the numeral 76. This shaft 74 is mounted within a section 78 of the valve casing and is adapted to be manually oscillated by manipulating a control handle 80. This control handle is keyed to the upper end of the stem 74, while a pair of abutments 82 and 84 are mounted at the lower end of the stem in position to be acted upon by dogs (not shown) when the valve is to be automatically controlled. The middle portion of the stem 74 carries an arm 86, which at its free end connects with one extremity of a longitudinally shiftable valve member 88. A chamber 90 presented at the extremity of the valve casing which houses the arm 86, is adapted to retain fluid under pressure, and hence it is desirable to provide means for preventing the leakage of fluid from the chamber 90 along the peripheral surface of the stem 74.

I provide a pair of annular grooves 92 on opposite sides of the arm 86, as clearly shown in Figure 4, to receive an annular section of the fluid medium 70a which is similar in functional and structural characteristics to the sealing medium 70 previously described. This sealing material 70a is adapted to be inserted under pressure through nipples or check valves 94, and the annular sections of the material within the recesses or grooves 92 provide an effective seal to counteract the tendency of fluid leakage along the peripheral surface of the stem 74.

As an additional precaution to prevent the leakage of fluid externally of the stem 74, I provide retainer members 52a, which are urged axially or inwardly by means of a coil spring 64a. These retainers 52a are similar in functional and structural characteristics to the retainer 52 previously described, and are provided with corresponding annular grooves 56a and 60a. A groove or annular recess 54a provided in the stem 74 functions similarly to the groove 54 in the retainer 52. Sealing medium under pressure may be introduced within the retainers 52a by means of suitable nipples or valves 96. Thus the sealing medium or material housed within the annular grooves associated with the retainers 52a provides effective means for preventing the escape of fluid along the stem 74.

It should be understood that when the valve is employed for low pressure fluids, it may not be necessary to use all of the seals shown in Figure 4. In fact, it may be sufficient in some instances to employ the retainers 52a alone, and in other instances it may be sufficient to employ the sealing material 70a alone. Obviously various modifications and changes may be made in the structural arrangement of these sealing devices without departing from the present invention.

From the foregoing it will be seen that my invention contemplates a fluid sealing device which is particularly adaptable to secure against leakage, fluid under pressure. Furthermore, by providing the retainers, for example, the retainer 52, any slight lateral displacement or variation of the shaft 30 will be compensated for so as to maintain the effectiveness of the seal. That is to say, if the shaft 30, due to the load transmitted thereto, experiences slight lateral displacement, the resilient or moldable characteristic of the seal cooperates to maintain the continuity of the sealing medium at the point of contact between the retainer and its associated parts. While in the present embodiment I have disclosed a definite form of sealing device, it should be understood that the invention is not limited to the specific arrangement disclosed, but is capable of numerous other modifications and changes without departing from the spirit and scope of the appended claims.

Having thus described my invention, what I claim as new and desire to secure by Letters Patent is:

1. In combination with a rotary member and a casing containing a chamber having fluid therein under pressure, a body of moldable material encircling said rotary member and in contact therewith to prevent leakage of fluid under pressure from said chamber along the surface of said rotary member, an annular member within the casing encircling the rotary member and constituting retaining means for the moldable material, said annular member being shiftable axially of the rotary member, an annular abutment fixed against movement axially of the rotary member, and means for urging said annular member axially of the rotary member into engagement with said abutment to maintain a predetermined load between the engaging surfaces thereof and to provide a mechanical seal therebetween.

2. In combination with a rotary member and a chamber having fluid therein under pressure, an annular abutment fixed to the rotary member for movement therewith, an annular member encircling the rotary member, said annular member being shiftable axially of the rotary member and having grooves therein forming an annular chamber opening inwardly in communication with the rotary member and an annular chamber opening axially in communication with said abutment, means through which fluid sealing material may be introduced into said annular chambers, and means for urging the annular member axially of the rotary member into engagement with the abutment to provide a mechanical seal therebetween, said mechanical seal and said sealing material combining to form a sealing means for the fluid within said chamber.

3. In combination with a rotary member and a chamber having fluid therein under pressure, an annular member encircling the rotary member, a housing encircling the annular member, said annular member having an annular chamber opening inwardly in communication with the rotary member and an annular chamber opening outwardly in communication with the housing, a communicating passageway within the annular member connecting said chambers, and means through which a body of moldable material may be introduced under pressure into said chambers, said material forming a sealing means for the fluid within the pressure chamber.

4. In combination with a rotary member and a fluid chamber adapted to receive fluid under pressure; an annular abutment fixed to the rotary member for movement therewith; an annular member encircling the rotary member and slidable axially therealong; a housing encircling the annular member; said annular member having an annular chamber opening inwardly into communication with the rotary member, an annular chamber opening axially in communication with the abutment, and an annular chamber opening outwardly in communication with the housing; passageways in said annular member connecting the annular chambers; means through which a body of moldable material may be introduced into said chambers; and means for urging the annular member axially of the rotary member into engagement with the abutment to provide a mechanical seal; said mechanical seal and said material combining to form a sealing means for the fluid in the pressure chamber.

5. In a sealing device, the combination of a rotary member, an anti-friction bearing means for the rotary member including a bearing member secured to the rotary member for movement therewith, an annular member encircling the rotary member and movable axially therealong, means for urging said annular member into engagement with the bearing member to provide a mechanical seal, said urging means comprising a spring for maintaining a predetermined load between the engaging surfaces of the annular member and the bearing member, said surfaces being of machined metal, and additional sealing means carried by the annular member on a plurality of sides thereof and cooperating with said first named seal.

ERNEST J. SVENSON.